United States Patent
Bentley

(10) Patent No.: US 12,236,404 B2
(45) Date of Patent: *Feb. 25, 2025

(54) SYSTEMS AND METHODS FOR FUTURE EVENT RECOMMENDATION

(71) Applicant: Yahoo Assets LLC, New York, NY (US)

(72) Inventor: Frank Richard Bentley, San Francisco, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,082

(22) Filed: Apr. 23, 2023

(65) Prior Publication Data
US 2023/0259890 A1  Aug. 17, 2023

Related U.S. Application Data

(63) Continuation of application No. 15/968,853, filed on May 2, 2018, now Pat. No. 11,636,442.

(51) Int. Cl.
| | |
|---|---|
| *G06Q 10/1093* | (2023.01) |
| *G06F 16/335* | (2019.01) |
| *G06F 40/205* | (2020.01) |
| *G06F 40/295* | (2020.01) |
| *G06N 20/00* | (2019.01) |
| *G06Q 10/02* | (2012.01) |

(Continued)

(52) U.S. Cl.
CPC ....... *G06Q 10/1095* (2013.01); *G06F 16/337* (2019.01); *G06F 40/205* (2020.01); *G06F 40/295* (2020.01); *G06N 20/00* (2019.01); *G06Q 10/02* (2013.01); *G06Q 10/107* (2013.01); *G06Q 30/0282* (2013.01); *H04L 51/216* (2022.05); *H04L 67/55* (2022.05)

(58) Field of Classification Search
None
See application file for complete search history.

(56) References Cited

U.S. PATENT DOCUMENTS

| | | | |
|---|---|---|---|
| 2012/0054054 A1* | 3/2012 | Kameyama | ........ G01C 21/3679 705/26.1 |
| 2013/0344899 A1* | 12/2013 | Stamm | .................. H04W 4/023 455/456.3 |

(Continued)

FOREIGN PATENT DOCUMENTS

| | | | |
|---|---|---|---|
| AU | 2017200650 B1 * | 10/2017 | ............. G06N 7/005 |

OTHER PUBLICATIONS

Ulrich Bareth et al, "geoXmart—A Marketplace for Geofence-Based Mobile Services," 2010, 34th Annual IEEE Computer Software and Applications Conference, pp. 101-106 (Year: 2010).*

*Primary Examiner* — Amanda Gurski
(74) *Attorney, Agent, or Firm* — Cooper Legal Group LLC

(57) ABSTRACT

One or more computing devices, systems, and/or methods for future event recommendation are provided. For example, messages of a user account of a user are parsed to identify messages corresponding to events attended by the user. Event features are extracted from the messages, where an event feature is descriptive of an aspect of an event. An event database of future events is queried using the event features to identify future events having one or more of the event features. A description of the future events is constructed and provided to the user.

20 Claims, 7 Drawing Sheets

(51) Int. Cl.
*G06Q 10/107* (2023.01)
*G06Q 30/0282* (2023.01)
*H04L 51/216* (2022.01)
*H04L 67/55* (2022.01)

(56) References Cited

U.S. PATENT DOCUMENTS

2016/0205506 A1* 7/2016 Turner ................ H04W 4/025
   455/456.3
2018/0330309 A1* 11/2018 Liden ............. G06Q 10/063118

* cited by examiner

SYSTEMS AND METHODS FOR FUTURE EVENT RECOMMENDATION

RELATED APPLICATION

This application claims priority to and is a continuation of U.S. application Ser. No. 15/968,853, filed on May 2, 2018, entitled "SYSTEMS AND METHODS FOR FUTURE EVENT RECOMMENDATION", which is incorporated by reference herein in its entirety.

BACKGROUND

Many users attend events, such as concerts, car shows, circuses, ballets, movie release parties, and/or a wide variety of other types of events. Half of events users attend are usually from performers that they have already seen in the past. For example, a user may see a particular musician that is performing at a local venue. When the user becomes aware of the musician visiting again, there is a relatively high probability that the user will have an interest in attending the upcoming performance by the musician.

Unfortunately, the user may spend substantial amounts of time and computing resources trying to track, over time, events in which the user may have an interest. For example, the user may visit websites, sign up for emails, track social network profiles of performers, etc. Otherwise, the user may miss out on learning about such events.

SUMMARY

In accordance with the present disclosure, one or more computing devices and/or methods for future event recommendation, are provided. In one embodiment, a message history repository stores messages such as emails, text messages, social network messages, or other types of messages of user accounts of users. The messages of a user account of a user are parsed to identify messages corresponding to events that were attended by the user, such as a receipt for a concert ticket of a concert the user attended two years ago. In one example, machine learning functionality trained to detect messages having features (e.g., keywords such as "concert tickets") indicative of events attended by users can be used to identify the messages corresponding to the events. In another example, a sender list of senders known to be associated with sending messages of bookings for events can be compared to senders of the messages to identify those messages corresponding to events attended by the user (e.g., messages received from a ticket booking agency).

Event features are extracted from the messages. An event feature may be descriptive of an aspect of an event. For example, an event feature may comprise a performer's name, an event name, a type of event such as a dog show or rock concert, and/or any other information used to identify an event or distinguish the event from other events. Entity recognition functionality, configured to identify entities such as performers from text, images, or other content within messages, may be used to extract the event features.

An event database is queried using the event features to identify future events having one or more of the event features. The event database may be locally hosted or may be hosted by a third party service or website such as the ticket booking agency or an entertainment and events website. In one example, the event database is queried with a musician's name of a musician that played at the concert that the user attended two years ago, and a future event may correspond to the musician playing again at an upcoming concert. The future events may be filtered such as based upon a location of the user or a predicted location that the user will be traveling (e.g., the messages may be evaluated to identify travel messages such as an air flight itinerary indicative of an upcoming trip of the user). In this way, a description of the future events is provided to the user, such as through a push notification, a user interface, etc.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
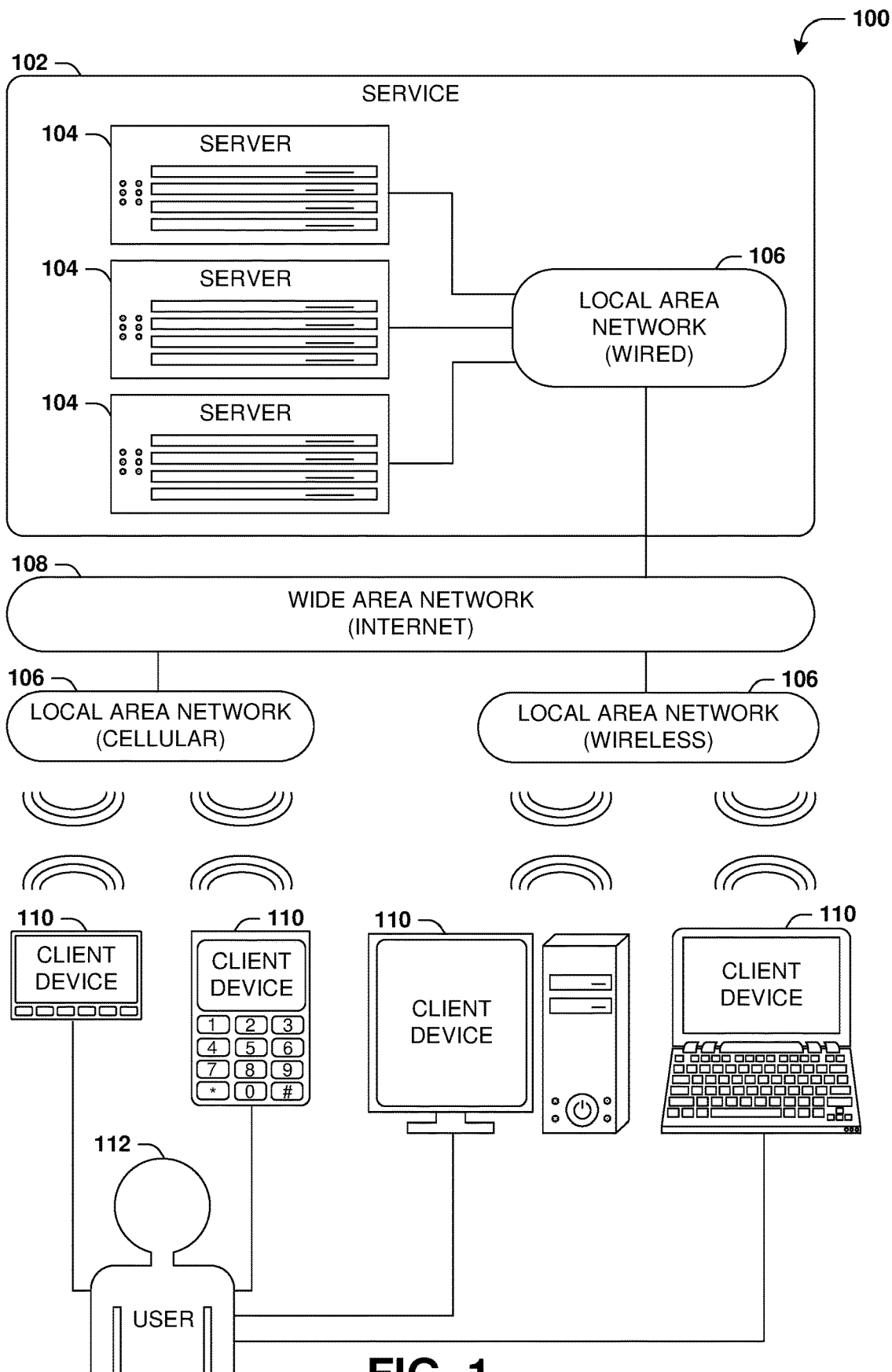
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
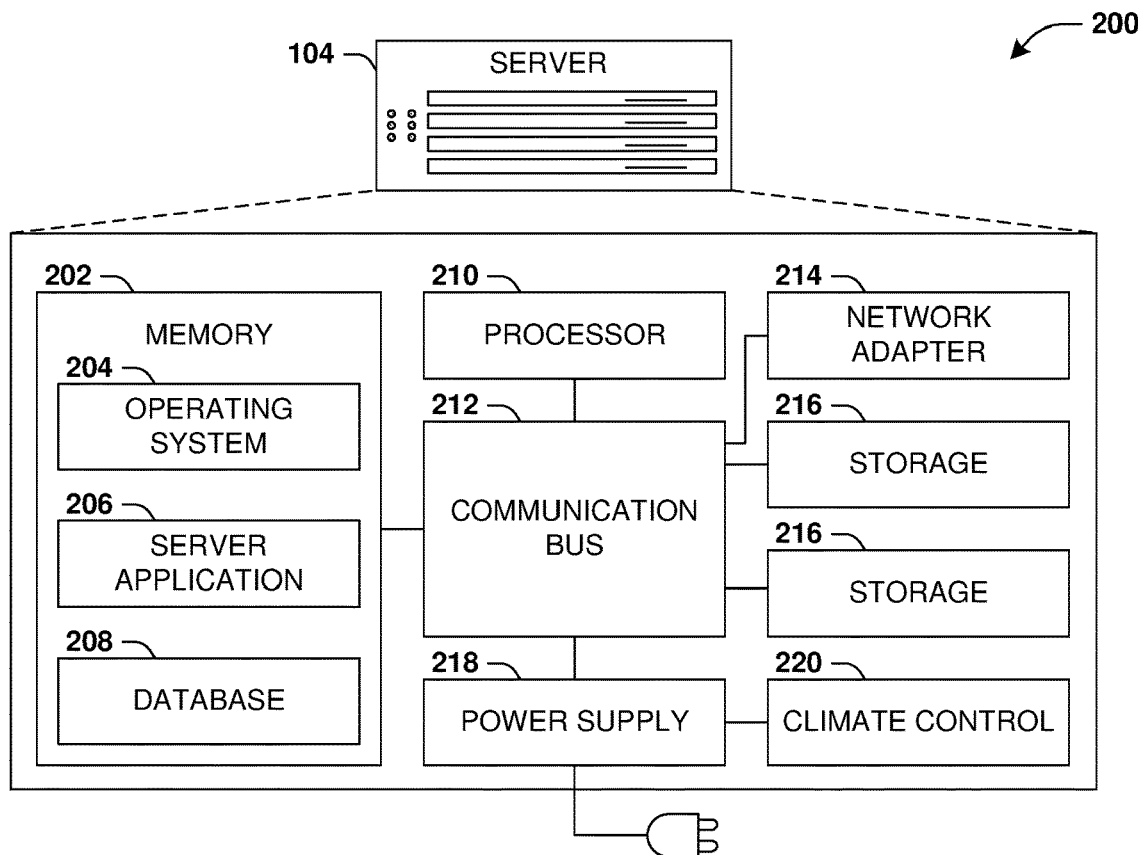
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
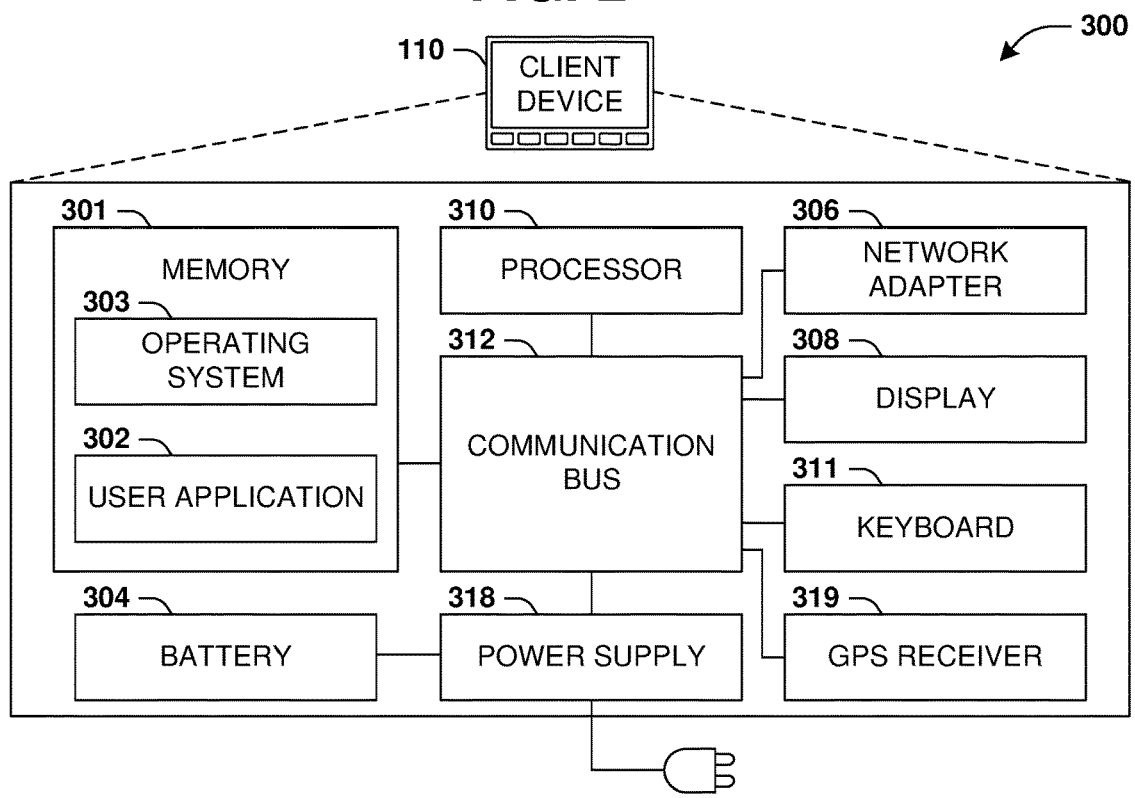
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for future event recommendation are provided. This technical process improves existing technological processes for making recommendations because this computer implemented technical process takes into consideration additional criteria used to identify future events to recommend to users. In particular, this technical process programmatically accesses and evaluates messages within a message history repository of a user account to identify messages corresponding to events attended by the user, such as through the use of machine learning functionality and/or using a sender list as search or filter criteria. In this way, events previously attended by the user can be identified from the message history repository, such as the user attending a particular concert last summer.

Event features are extracted from the messages, such as using entity recognition functionality. The event features may correspond to a performer's name, an event name, a type of event, etc. The event features are then used to query an event database of future events to identify future events having the event features. For example, a musician that performed at the concert last summer is used to query the event database to identify an upcoming concert with the musician. To improve accuracy and relevancy of recommendations, further filtering criteria can be used such as where future events located beyond a threshold distance of the user or predicted travel location of the user are filtered from the future events. In this way, the precision of computer implemented technological processes for recommending relevant content is improved so that computer resources are not wasted in identifying and transmitting less relevant recommendations over networks to computing devices of users.

A user may opt-in or opt-out for receiving future event recommendations. For example, the user may take affirmative action (e.g., provide consent through a user interface) to provide an event recommendation component with access to messages within a message account of the user, such as for the purposes of allowing the event recommendation component access to such messages for creating future event recommendations. Or, the user may opt-out (e.g., through the user interface) from allowing the event recommendation component to access the messages within the message account of the user.

Figure 4:
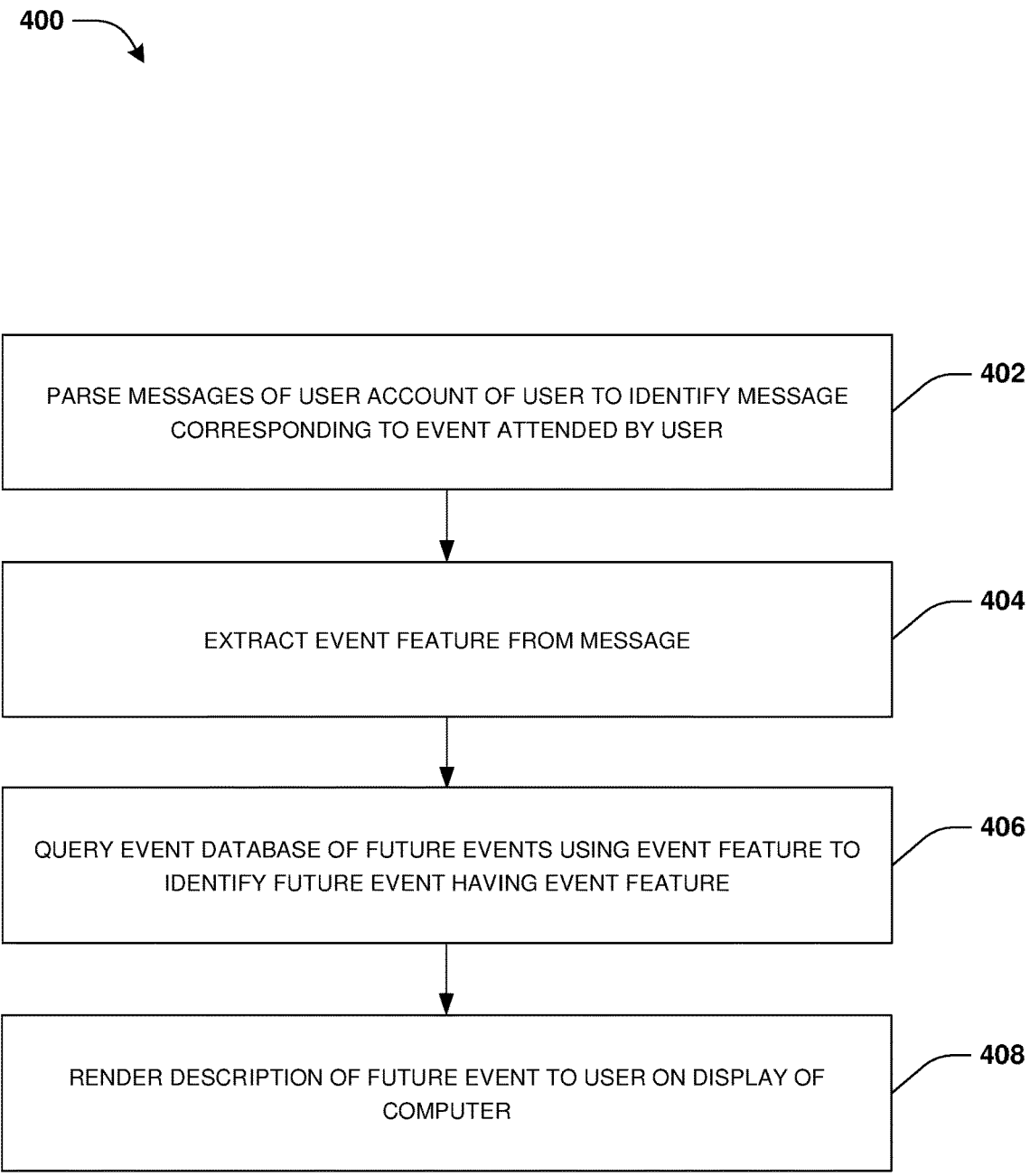
FIG. 4 is a flow chart illustrating an example method for future event recommendation.
Figure 5:
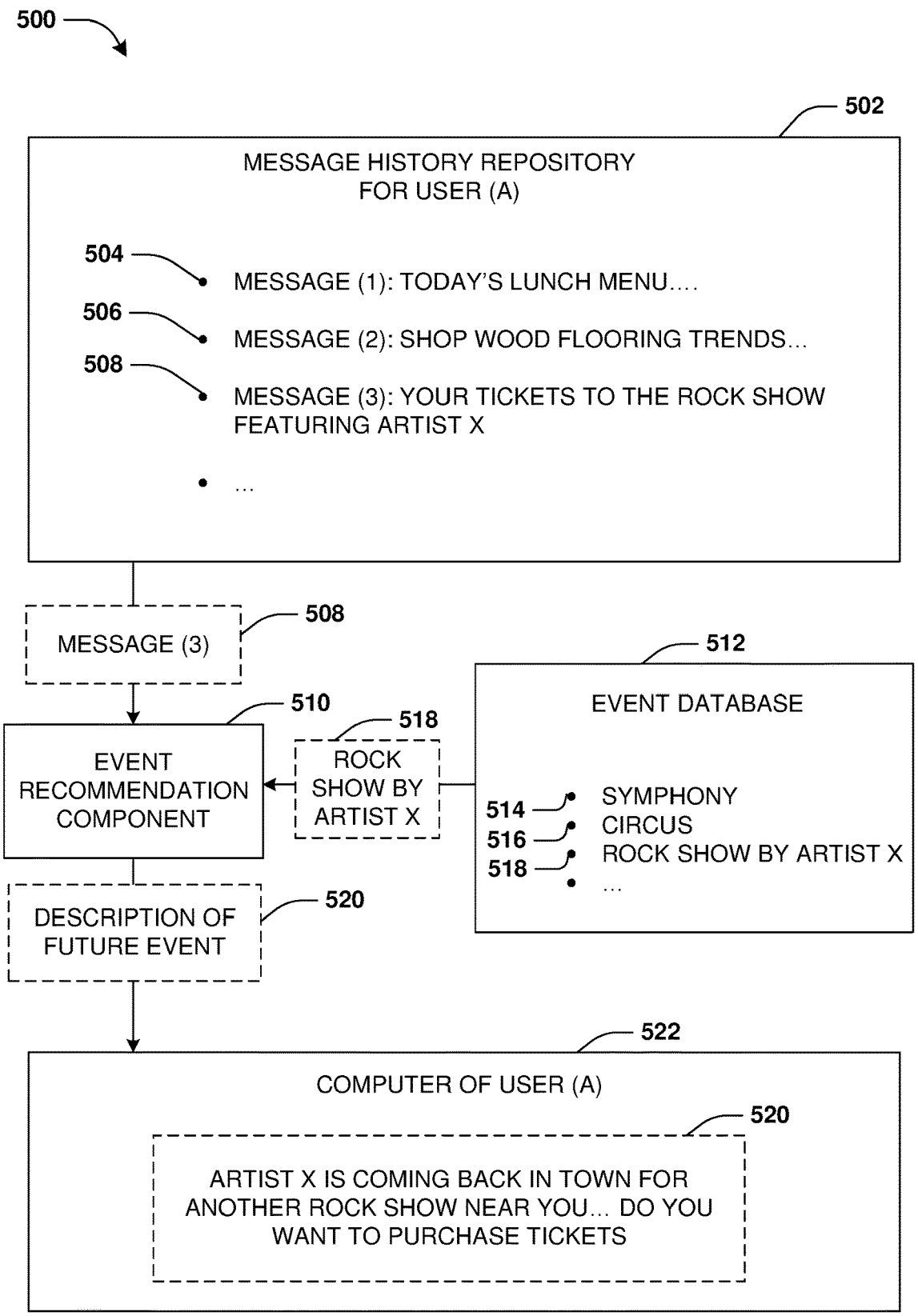
FIG. 5 is a component block diagram illustrating an example system for future event recommendation.

An embodiment of future event recommendation, is illustrated by an example method 400 of FIG. 4 and is described in conjunction with the system 500 of FIG. 5. A user (A) may have a user account such as an email account with a messaging service. The messaging service may store/archive messages associated with the user account within a message history repository 502. For example, the messaging service may store messages from an inbox, deleted messages, sent messages, and/or other messages within the message history repository 502. An event recommendation component 510 may be provided with access, such as through the message service, to the message history repository 502 of messages for the user (A).

At 402, messages within the message history repository 502 are parsed, such as by the event recommendation component 510, to identify messages corresponding to events attended by the user (A). The event recommendation component 510 may parse a first message 504, a second message 506, a third message 508, and/or other messages to determine whether such messages are indicative of the user (A) having attended events.

The event recommendation component 510 may execute various functionality upon the messages to filter the messages in order to identify messages indicative of the user (A) attending events as opposed to other types of messages. The event recommendation component 510 may execute machine learning functionality to evaluate the messages to detect messages having features indicative of events attended by the user (A). The machine learning functionality may be trained to detect such features as keywords or phrases, such as "event booking", "show tickets", "receipt", phrases indicative of an event name, phrases indicative of messages comprising a receipt or tickets for a booked event, and/or other phrases. The machine learning functionality may be trained to detect such features as named entities such as a musician's name or an event name. The machine learning functionality may be trained to evaluate attachments, images within attachments or a message body (e.g., execute image recognition functionality to identify an image as a ticket for an event), and/or other types of content to determine whether such content has features indicative of users attending events.

In another example of parsing the messages, the event recommendation component 510 may utilize a sender list of senders known to be associated with sending messages of bookings for events. In particular, the event recommendation component 510 parses the messages to identify messages having senders that are specified within the sender list of senders known to be associated with sending messages of booking for events. For example, a ticket booking agency may be known to allow users to buy tickets to various performances, and thus messages within the message history repository 502 from the ticket booking agency may have a relatively higher likelihood of relating to events booked by the user (A) through the ticket booking agency.

In this way, the event recommendation component 510 may parse messages within the message history repository 502 to identify messages associated with the user (A) attending events, such as messages comprising receipts of bookings to attend events by the user (A). For example, the event recommendation component 510 may determine that the first message 504 regarding today's lunch menu does not comprise features corresponding to the user (A) attending an event. The event recommendation component 510 may determine that the second message 506 regarding shopping for wood flooring trends also does not comprise features corresponding to the user (A) attending an event. The event recommendation component 510 may determine that the third message 508 regarding tickets to a rock show featuring Artist X comprises features corresponding to the user (A) attending an event. The feature may correspond to keywords such as "rock show", "tickets", a named entity "Artist X", extracted features of an attached ticket image, etc.

In one example, the event recommendation component 510 parses messages associated with a plurality of user accounts of the user (A), such as email messages, social network messages, text messages, social network posts (e.g., the user (A) may have posted last year about attending a car show), etc. In this way, the event recommendation component 510 parses the messages from the various user accounts in order to identify messages from the user accounts that correspond to events attended by the user (A).

At 404, event features are extracted from the third message 508, such as by the event recommendation component 510. The event recommendation component 510 may execute entity recognition functionality upon the third message 508 to identify a name of a performer at the event as an event feature, an event name of the event as an event feature, an event type of the event as the event feature, etc. For example, the event recommendation component 510 may extract a Rock Show event feature as a name of the event and an Artist X event feature as a name of a performer at the event.

At 406, an event database 512 and/or other data sources of future events may be queried using the event features to identify one or more future events having one or more of the event features. The event database 512 may be associated with a website, a service, or other data sources that maintain a list of upcoming events, such as a symphony future event 514, a circus future event 516, a Rock Show by Artist X future event 518, etc. The event recommendation component 510 can query the event database 512 using the Rock Show event feature and the Artist X event feature that were extracted from the third message 508 corresponding to an event previously attended by the user (A). Based upon the query, the event recommendation component 510 may identify a future event as the Rock Show by Artist X future event 518.

In one example, the event recommendation component 510 may filter a set of future events identified from the event database 512 based upon various filtering criteria. For example, a current location of the user (A) (e.g., a GPS location of a computer 522 of the user (A)) is identified. The set of future events are filtered to remove future events located beyond a threshold distance from the current location.

At 408, the event recommendation component 510 constructs and renders a description 520 of the Rock Show by Artist X future event 518 to the user (A) on a display of the computer 522 associated with user (A). The description 520 may be constructed to include information about the Artist X, information about the Rock Show event and its location, a link to purchase tickets to the Rock Show event, images or other content about the Rock Show and/or the Artist X, etc. In one example, the description 520 is rendered through a user interface that is populated with booking functionality through which the user (A) can purchase tickets to the Rock Show. The user interface may be displayed through the computer 522, such as through a message interface that provides user (A) with access to messages of the user account.

In another example, the description 520 is rendered through the computer 522 as a push notification. In responsive to receiving a forward command from the user (A) to forward the push notification to a second user, the push notification is transmitted to a second computer of the second user. The event recommendation component 510 may provide the user (A) with a list of recommended users for forwarding the push notification, such as users within a threshold distance of the user that may be interested in the future event, users that have attended events with the user in the past, social network friends, friends within a contact list, etc. In another example, the description 520 is sent as a recommendation message to the user account.

In one embodiment of event recommendation, the messages are parsed to identify a second message corresponding to a travel event. The travel event may correspond to the user (A) having traveled to a location, such as to Miami during spring break last year. A travel feature may be extracted from the second message. The travel feature may correspond to a travel date, a hotel booking, an air flight, or other travel information associated with the user (A) traveling to Miami. The event database 512 may be queried using the travel feature to identify a second future event corresponding to the travel feature, such as an air flight, a hotel, or an event occurring in Miami. In this way, a description of the second future event may be provided to the user (A).

Figure 6:
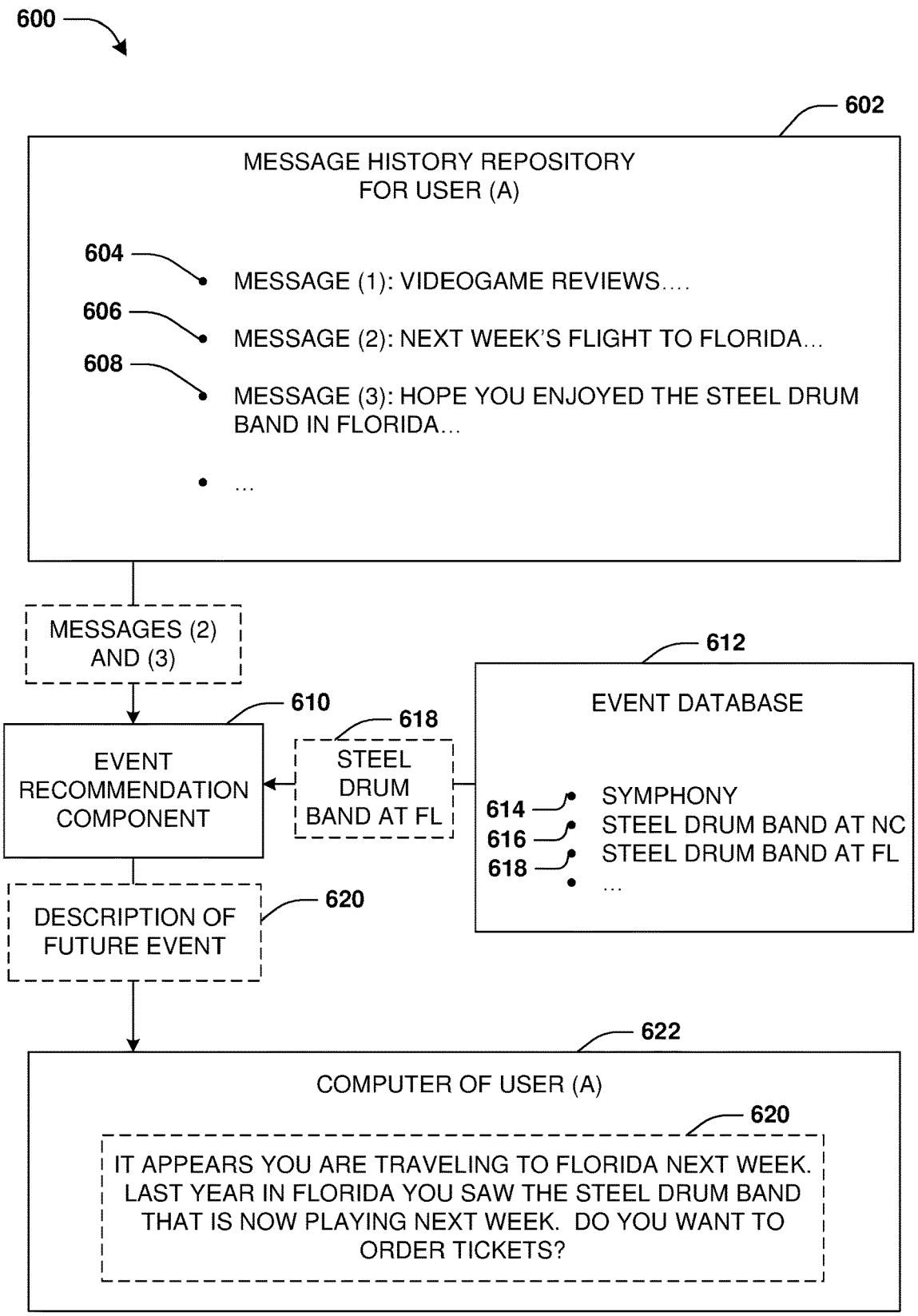
FIG. 6 is a component block diagram illustrating an example system for future event recommendation.

FIG. 6 illustrates a system 600 for future event recommendation. An event recommendation component 610 may access a message history repository 602 comprising messages of a user account for a user (A), such as a first message 604 regarding videogame reviews, a second message 606 regarding an upcoming flight to Florida, and a third message 608 regarding the user (A) attending a Steel Drum band event last summer. The event recommendation component 610 parses the messages to identify messages corresponding to events attended by the user (A), such as the third message 608 regarding the user (A) attending the Steel Drum band event last summer. For example, the third message 608 may comprise features indicative of a user attending an event, such as keywords "event", "receipt", a named entity of a performer, a venue name, etc.

The event recommendation component 610 may also parse the messages to identify messages indicating that the user (A) has upcoming travel plans, such as where the user (A) will be traveling to a travel location for a travel period. For example, the event recommendation component 610 may parse the second message 606 to determine that features of the second message 606 are indicative of the user (A) traveling next week to Florida, such as features extracted from keywords "flight to Florida" and from a flight itinerary listed within a message body or attached to the second message 606. The travel location and the travel period may be used to filter future events to remove future events that are not located a threshold distance of the travel location during the travel period.

The event recommendation component 610 extracts event features from the third message 608, such as a Steel Drum Band named entity as an event feature. The event recommendation component 610 queries an event database 612 of future events, such as a symphony future event 614, a Steel Drum Band show at North Carolina future event 616, and a Steel Drum Band show at Florida future event 618, using the Steel Drum Band name entity. In this way, the event recommendation component 610 identifies the Steel Drum Band show at North Carolina future event 616 and the Steel Drum Band show at Florida future event 618 as having the event feature of the Steel Drum Band named entity.

In one example of querying the event database 612, the event recommendation component 610 filters future events identified as having the event feature based upon the travel location and the travel period. For example, the user (A) may be traveling next week from Wilmington to Miami Florida, and thus the event recommendation component 610 may make future event recommendations of events in Florida for the trip. Accordingly, the event recommendation component 610 filters future events to remove those future events that are located beyond a threshold distance from the travel location and/or are occurring outside the travel period. Thus, the event recommendation component 610 removes the Steel Drum Band show at North Carolina future event 616 because it is a threshold distance from the travel location of Florida.

Having filtered future events identified as corresponding to the event features, the event recommendation component 610 constructs a description 620 of the Steel Drum Band show at Florida future event 618. The event recommendation component 610 transmits the description 620 to a computer 622 of the user (A) for rendering on a display of the computer 622.

Figure 7:
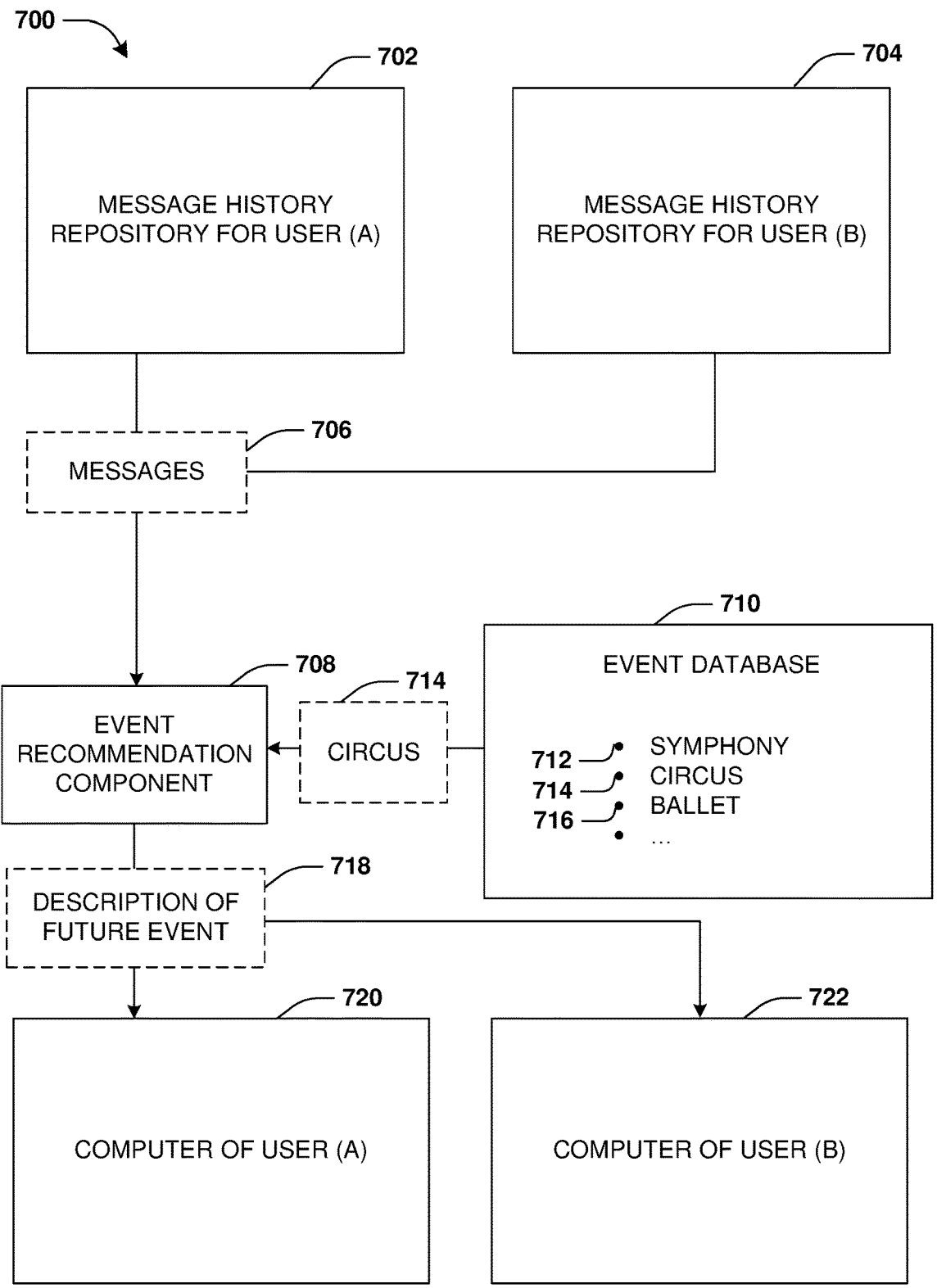
FIG. 7 is a component block diagram illustrating an example system for future event recommendation, where a future event is recommended to two users.

FIG. 7 illustrates a system 700 for future event recommendation. An event recommendation component 708 may access a first message history repository 702 comprising messages of a first user account for a user (A) and a second message history repository 704 comprising messages of a second user account of a user (B). The event recommendation component 708 may determine that the user (A) and the user (B) have an association, such as from being social network friends, being within a contact list, having sent messages to one another, etc. Accordingly, the event recommendation component 708 may construct future event notifications of future events that the user (A) and the user (B) may have an interest in attending together.

The event recommendation component 708 may parse messages within the first message history repository 702 and within the second message history repository 704 to identify messages 706 indicative of the user (A) and the user (B) attending events. The event recommendation component 708 may evaluated those messages 706 to determine that the user (A) and the user (B) both attended a circus (e.g., the same circus show or separate occurrences of the same circus show at different times). The event recommendation component 708 extracts event features from the messages 706, such as an event name and event type of the circus. Accordingly, the event recommendation component 708 queries an event database 710 of future events, such as a symphony future event 712, a circus future event 714, and a ballet future event 716, to identify the circus future event 714 as corresponding to event features of the messages 706.

The event recommendation component 708 constructs a description 718 of the circus future event 714 to recommend that both the user (A) and the user (B) should attend the circus future event 714. In this way, the event recommendation component 708 transmits the description 718 over a network to a computer 720 of the user (A) and a computer 722 of the user (B) for display.

In another embodiment, messages of a user account of a user are parsed to identify messages corresponding to the user traveling, such as messages indicative of the user recurringly traveling to a same destination. In one example, the messages may be parsed to identify messages comprising travel receipts. For example, the identified messages may comprise travel receipts of the user traveling to Toronto every 3 months (e.g., the user travels to Toronto every 3 months for work). Accordingly, a recommendation can be preemptively constructed and provided to the user before a next occurrence of the trip so that the user can easily rebook the trip. The recommendation may comprise flights similar to flights the user previously booked (e.g., similar times, similar number of layovers, similar airports, similar seating classes, similar bag check options, similar selected travel insurance options, etc.), similar or the same hotel booked by the user, and/or a variety of other suggestions such as new restaurants or sights to try or the same restaurants and sights the user previously tried.

In another embodiment, messages of a user account of a user are parsed to identify messages corresponding to purchases, such as messages indicative of the user recurringly purchasing a product or service. In one example, the messages may be parsed to identify messages comprising purchase receipts. For example, the identified messages may comprise purchase receipts for a water filter that the user purchases every 5 months. Accordingly, a recommendation to purchase the water filter may be preemptively constructed and provided to the user before a next occurrence of when the user would usually repurchase the water filter, such as a week before. The recommendation may comprise a link to purchase the water filter, a suggested alternative replacement water filter to try, etc.

Figure 8:
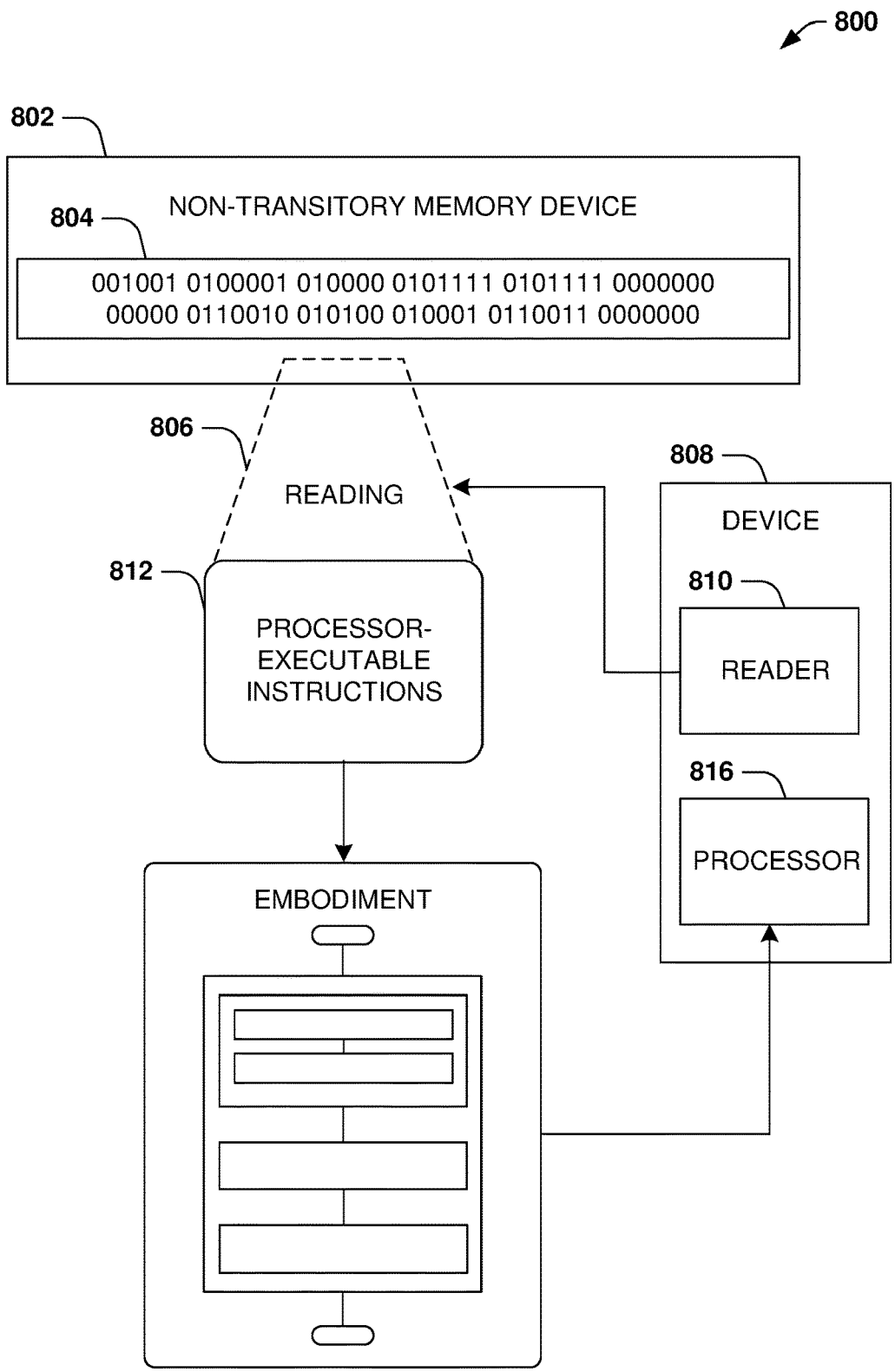
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system, such as at least some of the example system 500 of FIG. 5, at least some of the example system 600 of FIG. 6, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
a processor; and
memory comprising processor-executable instructions that when executed by the processor cause performance of operations, the operations comprising:
rendering a user interface comprising a selectable option associated with opting-in to provide access to messages of a user account of a user for use in determining one or more recommendations;
receiving, via the user interface, a selection of the selectable option associated with opting-in to provide the access to the messages for use in determining one or more recommendations;
after receiving the selection of the selectable option via the user interface, parsing messages, within a message history repository, of the user account of the user to identify a message corresponding to an action associated with the user, wherein the parsing comprises evaluating the messages to detect messages having one or more features indicative of one or more actions associated with the user;
extracting a feature, of the one or more features, from the message, wherein the feature is descriptive of an aspect of the action;
identifying a current location of the user;
querying a database of future actions using the feature to identify a plurality of future actions having the feature;
evaluating, based upon a threshold distance and the current location of the user, the plurality of future actions identified as having the feature extracted from the message to determine whether each future action of the plurality of future actions is within the threshold distance of the current location of the user, wherein the evaluation comprises:
evaluating a future action, of the plurality of future actions identified as having the feature extracted from the message corresponding to the action associated with the user, based upon the threshold distance and determining that the future action identified as having the feature is within the threshold distance of the current location of the user; and
evaluating one or more other future actions, of the plurality of future actions identified as having the feature extracted from the message corresponding to the action associated with the user, based upon the threshold distance and determining that the one or more other future actions identified as having the feature are beyond the threshold distance from the current location of the user;
selecting the future action of the plurality of future actions, without selecting the one or more other future actions of the plurality of future actions, based upon the evaluation of the plurality of future actions indicating that the future action is within the threshold distance of the current location of the user and that the one or more other future actions are beyond the threshold distance from the current location of the user; and
based upon the selection of the future action based upon the evaluation of the plurality of future actions, rendering, on a display of a computer, information associated with the future action.

2. The computing device of claim 1, wherein the identifying the current location of the user comprises detecting a global positioning system (GPS) location of the user.

3. The computing device of claim 1, wherein the operations comprise:
parsing the messages to identify a second message indicating that the user is traveling to a travel location for a travel period; and
selecting a second future action, of the plurality of future actions, based upon a determination that the second future action is within a second threshold distance of the travel location within the travel period without selecting one or more other second future actions, of the plurality of future actions, based upon a determination that the one or more other second future actions are at least one of beyond the second threshold distance from the travel location or outside of the travel period.

4. The computing device of claim 1, wherein the operations comprise:
rendering the information associated with the future action through a user interface populated with booking functionality; and
booking the user in association with the future action based upon user interaction with the booking functionality.

5. The computing device of claim 4, wherein the user interface populated with the booking functionality is populated within a message interface used to provide access to the messages of the user account.

6. The computing device of claim 1, wherein the operations comprise:
transmitting the information associated with of the future action through a recommendation message to the user account.

7. The computing device of claim 1, wherein the operations comprise:
identifying a second user having an association with the user;
parsing messages, within the message history repository, of a second user account of the second user to identify a second message corresponding to a second action associated with the second user;
determining that (i) the action corresponding to the message identified in the parsed messages of the user account of the user and (ii) the second action corresponding to the second message identified in the parsed messages of the second user account of the second user are separate occurrences of a same action; and
based upon the action associated with the user and the second action associated with the second user being separate occurrences of the same action, sending a recommendation message to the user and the second user regarding the user and the second user both being associated with the future action.

8. The computing device of claim 1, wherein the operations comprise:
identifying a second user having an association with the user;
parsing messages, within the message history repository, of a second user account of the second user to identify a second message corresponding to the action associated with the second user; and
based upon the user and the second user having an association with the same action, sending a recommendation message to the user and the second user regarding the user and the second user both being associated with the future action.

9. The computing device of claim 1, wherein the operations comprise:
parsing messages associated with a plurality of user accounts of the user to identify a set of messages corresponding to actions associated with the user;
extracting features from the set of messages;
querying one or more action databases of future actions using the features to identify a second plurality of future actions having one or more of the features; and
providing a description of the second plurality of future actions to the user.

10. The computing device of claim 1, wherein the operations comprise:
responsive to receiving a forward command associated with forwarding the information to a second user, transmitting the information to a second computer.

11. The computing device of claim 1, wherein the operations comprise:
providing a list of recommended users for forwarding the information.

12. The computing device of claim 11, wherein the operations comprise:
generating the list of recommended users based upon users determined to be within a second threshold distance of the user.

13. The computing device of claim 11, wherein the operations comprise:
generating the list of recommended users based upon users determined to have been associated with one or more actions associated with the user.

14. The computing device of claim 11, wherein the operations comprise:
generating the list of recommended users based upon social network friends of the user.

15. The computing device of claim 11, wherein the operations comprise:
generating the list of recommended users based upon a contact list of the user.

16. A method, comprising:
rendering a user interface comprising a selectable option associated with opting-in to provide access to messages of a user account of a user for use in determining one or more recommendations;
receiving, via the user interface, a selection of the selectable option associated with opting-in to provide the access to the messages for use in determining one or more recommendations;
after receiving the selection of the selectable option via the user interface, parsing messages, within a message history repository, of the user account of the user to identify a message corresponding to an action associated with the user, wherein the parsing comprises evaluating the messages to detect messages having one or more features indicative of one or more actions associated with the user;
extracting a feature, of the one or more features, from the message, wherein the feature is descriptive of an aspect of the action;
identifying a current location of the user;
querying a database of future actions using the feature to identify a plurality of future actions having the feature;
evaluating, based upon a threshold distance and the current location of the user, the plurality of future actions identified as having the feature extracted from the message to determine whether each future action of the plurality of future actions is within the threshold distance of the current location of the user, wherein the evaluation comprises:
evaluating a future action, of the plurality of future actions identified as having the feature extracted from the message corresponding to the action associated with the user, based upon the threshold distance and determining that the future action identified as having the feature is within the threshold distance of the current location of the user; and
evaluating one or more other future actions, of the plurality of future actions identified as having the feature extracted from the message corresponding to the action associated with the user, based upon the threshold distance and determining that the one or more other future actions identified as having the feature are beyond the threshold distance from the current location of the user;
selecting the future action of the plurality of future actions, without selecting the one or more other future actions of the plurality of future actions, based upon the evaluation of the plurality of future actions indicating that the future action is within the threshold distance of the current location of the user and that the one or more other future actions are beyond the threshold distance from the current location of the user; and
based upon the selection of the future action based upon the evaluation of the plurality of future actions, rendering, on a display of a computer, information associated with the future action.

17. The method of claim 16, comprising:
responsive to receiving a forward command associated with forwarding the information to a second user, transmitting the information to a second computer.

18. The method of claim 16, comprising:
providing a list of recommended users for forwarding the information.

19. A non-transitory machine readable medium having stored thereon processor-executable instructions that when executed cause performance of operations, the operations comprising:
rendering a user interface comprising a selectable option associated with opting-in to provide access to messages of a user account of a user;
receiving, via the user interface, a selection of the selectable option associated with opting-in to provide the access to the messages;
after receiving the selection of the selectable option via the user interface, parsing messages, within a message history repository, of the user account of the user to identify a message corresponding to an action associated with the user, wherein the parsing comprises evaluating the messages to detect messages having one or more features indicative of one or more actions associated with the user;
extracting a feature, of the one or more features, from the message, wherein the feature is descriptive of an aspect of the action;
identifying a current location of the user;
querying a database of future actions using the feature to identify a plurality of future actions having the feature;
evaluating, based upon a threshold distance and the current location of the user, the plurality of future actions identified as having the feature extracted from the message to determine whether each future action of the plurality of future actions is within the threshold distance of the current location of the user, wherein the evaluation comprises:

evaluating a future action, of the plurality of future actions identified as having the feature extracted from the message corresponding to the action associated with the user, based upon the threshold distance and determining that the future action identified as having the feature is within the threshold distance of the current location of the user; and evaluating one or more other future actions, of the plurality of future actions identified as having the feature extracted from the message corresponding to the action associated with the user, based upon the threshold distance and determining that the one or more other future actions identified as having the feature are beyond the threshold distance from the current location of the user;

selecting the future action of the plurality of future actions, without selecting the one or more other future actions of the plurality of future actions, based upon the evaluation of the plurality of future actions indicating that the future action is within the threshold distance of the current location of the user and that the one or more other future actions are beyond the threshold distance from the current location of the user; and based upon the selection of the future action based upon the evaluation of the plurality of future actions, rendering, on a display of a computer, information associated with the future action.

20. The non-transitory machine readable medium of claim 19, wherein the operations comprise:

responsive to receiving a forward command associated with forwarding the information to a second user, transmitting the information to a second computer.

* * * * *